(12) United States Patent
Bantukul

(10) Patent No.: US 10,327,175 B2
(45) Date of Patent: Jun. 18, 2019

(54) METHODS, SYSTEMS, AND COMPUTER READABLE MEDIA FOR OPERATING A TELECOMMUNICATIONS NETWORK USING AN ON-PREMISES COMPUTING SYSTEM AND AN OFF-PREMISES CLOUD COMPUTING SYSTEM

(71) Applicant: Oracle International Corporation, Redwood Shores, CA (US)

(72) Inventor: Apirux Bantukul, Cary, NC (US)

(73) Assignee: Oracle International Corporation, Redwood Shores, CA (US)

(*) Notice: Subject to any disclaimer, the term of this patent is extended or adjusted under 35 U.S.C. 154(b) by 0 days.

(21) Appl. No.: 15/653,487

(22) Filed: Jul. 18, 2017

(65) Prior Publication Data

US 2019/0028927 A1    Jan. 24, 2019

(51) Int. Cl.
*H04W 72/04* (2009.01)
*H04W 28/08* (2009.01)
(Continued)

(52) U.S. Cl.
CPC ............ *H04W 28/08* (2013.01); *G06F 9/505* (2013.01); *H04L 41/5096* (2013.01);
(Continued)

(58) Field of Classification Search
CPC ..... H04L 63/08; H04L 63/10; H04L 63/0807; H04L 67/1095; H04L 67/34; H04L 67/06; H04L 67/10; H04L 67/18; H04L 12/1485; H04L 12/1489; H04L 41/147; H04L 47/70; H04L 47/823; H04L 63/0272
See application file for complete search history.

(56) References Cited

U.S. PATENT DOCUMENTS 9,172,766 B2    10/2015  Narasimhan et al.
9,342,357 B2    5/2016   Grueneberg et al.
(Continued)

FOREIGN PATENT DOCUMENTS

WO    WO 2019/018472    1/2019

OTHER PUBLICATIONS

"Hybrid Cloud Architectures with AWS," Amazon Web Services, https://aws.amazon.com/enterprise/hybrid/, pp. 1-9 (Accessed on Mar. 31, 2017).
(Continued)

*Primary Examiner* — Sai Aung
(74) *Attorney, Agent, or Firm* — Jenkins, Wilson, Taylor & Hunt P.A.

(57) ABSTRACT

Methods, systems, and computer readable media for operating a telecommunications network using an on-premises computing system and an off-premises cloud computing system. In some examples, a method includes executing, at an on-premises computing system including at least one processor, one or more network-impacting telecommunications functions for the telecommunications network. The method includes offloading, at the on-premises computing system using an on-premises network, one or more other telecommunications functions for the telecommunications network to an off-premises cloud computing system remote from the on-premises network.

19 Claims, 6 Drawing Sheets

(51) Int. Cl.
*G06F 9/50* (2006.01)
*H04W 40/34* (2009.01)
*H04L 29/08* (2006.01)
*H04L 12/24* (2006.01)
*H04W 4/14* (2009.01)
*H04W 80/04* (2009.01)
*H04W 92/14* (2009.01)

(52) U.S. Cl.
CPC ......... *H04L 67/1002* (2013.01); *H04W 40/34* (2013.01); *H04L 41/0896* (2013.01); *H04W 4/14* (2013.01); *H04W 80/04* (2013.01); *H04W 92/14* (2013.01)

(56) References Cited

U.S. PATENT DOCUMENTS

| | | | |
|---|---|---|---|
| 2010/0064033 A1 | 3/2010 | Travostino et al. | |
| 2012/0064908 A1* | 3/2012 | Fox | H04W 28/10 455/452.2 |
| 2013/0238751 A1* | 9/2013 | Raleigh | H04L 67/20 709/217 |
| 2013/0311778 A1* | 11/2013 | Cherukuri | H04L 63/0272 713/171 |
| 2014/0040975 A1 | 2/2014 | Raleigh et al. | |
| 2015/0124622 A1 | 5/2015 | Kovvali et al. | |
| 2016/0330749 A1 | 11/2016 | Mehrabanzad et al. | |
| 2016/0352682 A1 | 12/2016 | Chang et al. | |
| 2017/0366605 A1* | 12/2017 | Chang | H04L 47/70 |
| 2018/0063877 A1* | 3/2018 | Nakano | H04M 3/00 |

OTHER PUBLICATIONS

"ProductCato Cloud Network Sercurity Services," CATO Netwroks, http://www.catonetworks.com/use-cases/hybrid-cloud-network-integration/, pp. 1-3 (Accessed on Mar. 31, 2017).

"Extending VPN Connectivity to Amazon AWS VPC using AWS VPC VPN Gateway Service," PEN VPN Access Server, https://docs.openvpn.net/how-to-tutorialsguides/administration/extending-vpn-connectivity-to-amazon-aws-vpc-using-aws-vpc-vpn-gateway-service/, pp. 1-5 (Accessed on Mar. 31, 2017).

"Connect an on-premises network to a Microsoft Azure virtual network," https://technet.microsoft.com/en-us/library/dn786406.aspx, pp. 1-12 (Dec. 12, 2016).

Notification of Transmittal of the International Search Report and the Written Opinion of the International Searching Authority, or the Declaration for International Application No. PCT/US2018/042607 (dated Sep. 28, 2018).

* cited by examiner

METHODS, SYSTEMS, AND COMPUTER READABLE MEDIA FOR OPERATING A TELECOMMUNICATIONS NETWORK USING AN ON-PREMISES COMPUTING SYSTEM AND AN OFF-PREMISES CLOUD COMPUTING SYSTEM

TECHNICAL FIELD

The subject matter described herein relates generally to operating telecommunications networks. More particularly, the subject matter described herein relates to methods, systems, and computer readable media for operating a telecommunications network using an on-premises computing system and an off-premises cloud computing system.

BACKGROUND

A $3^{rd}$ Generation Partnership Project (3GPP) mobile network, such as a long term evolution (LTE) network, typically includes a core network, a transport network, and one or more radio access networks. The core network for the mobile network establishes bearers (logical connections) among service nodes on a path between a wireless device, attached to one of the radio access networks, and a packet network, e.g., the Internet. The service nodes then use the bearers to transport subscriber traffic between the wireless device and the packet network.

Telecommunication network operators have been reluctant to utilize cloud services in their networks due to reliability concerns. For example, Diameter routing, policy control, and session border control are all telecommunications functions respectively performed by Diameter signaling routers (DSRs), policy and charging rules functions (PCRFs), and session border controllers (SBCs). Other telecommunications functions, such as shared data quotas, sponsored data, complex billing and charging, and network analytics are provided by the same network nodes.

Accordingly, in light of these difficulties, there exists a need for methods, systems, and computer readable media for using off-premises cloud computing systems in operating a telecommunications network.

SUMMARY

The subject matter described in this specification relates to methods, systems, and computer readable media for operating a telecommunications network using an on-premises computing system for network-impacting functions and an off-premises cloud computing system for other telecommunications functions. In some examples, a method includes executing, at an on-premises computing system including at least one processor, one or more network-impacting telecommunications functions for the telecommunications network. The method includes offloading, at the on-premises computing system using an on-premises network, one or more other telecommunications functions for the telecommunications network to an off-premises cloud computing system remote from the on-premises network.

In some aspects of the subject matter described in this specification, a system includes an on-premises network for the telecommunications network; an off-premises cloud computing system remote from the on-premises network; and an on-premises computing system comprising at least one processor and configured for: executing one or more network-impacting telecommunications functions for the telecommunications network; and offloading one or more other telecommunications functions for the telecommunications network to the off-premises cloud computing system using the on-premises network.

In some examples, in operation, each of the network-impacting telecommunications functions is capable, in operation, of disrupting service on the telecommunications network and each of the other telecommunications functions is not capable, in operation, of disrupting service on the telecommunications network. In some examples, each of the network-impacting telecommunications functions is defined in a telecommunications standards document as a network-impacting function.

In some examples, the on-premises computing system includes a first computer system, and executing the network-impacting telecommunications functions includes executing a policy and charging rules function (PCRF) on the first computer system. In some examples, the on-premises computing system includes a second computer system and a third computer system, and executing the network-impacting telecommunications functions includes executing a session border controller (SBC) on the second computer system and executing a Diameter signaling router (DSR) on the third computer system.

In some examples, offloading the other telecommunications functions for the telecommunications network to the off-premises cloud computing system includes offloading one or more of: a shared quota function, a sponsored data function, a complex billing/charging function, and a network analytics function.

In some examples, offloading the other telecommunications functions for the telecommunications network to the off-premises cloud computing system includes sending, using the on-premises network, telecommunications data to the cloud computing system using a cloud application programming interface (API) for an application implementing one of the other telecommunications functions. In some examples, offloading the other telecommunications functions for the telecommunications network to the off-premises cloud computing system includes receiving, using the on-premises network and an on-premises API for the application, application-specific data responsive to the telecommunications data.

In some examples, the cloud computing system is configured to execute an event recorder to record events generated by applications implementing the other telecommunications functions executing the cloud computing system. In some examples, the cloud computing system is configured to replay services after cloud services become available following an outage using events recorded prior to the outage.

In some examples, the on-premises computing system is configured to execute an event recorder to record events generated by the telecommunications network or other network-impacting telecommunications functions. In some examples, the on-premises computing system is configured to replay the recorded events after cloud services become available following an outage.

The subject matter described in this specification may be implemented in hardware, software, firmware, or any combination thereof. As such, the terms "function", "node" or "module" as used herein refer to hardware, software and/or firmware components for implementing the feature(s) being described. In some examples, the subject matter described herein may be implemented using a non-transitory computer readable medium having stored thereon computer executable instructions that when executed by the processor of a computer cause the computer to perform steps.

Computer readable media suitable for implementing the subject matter described herein include non-transitory computer-readable media, such as disk memory devices, chip memory devices, programmable logic devices, random access memory (RAM), read only memory (ROM), optical read/write memory, cache memory, magnetic read/write memory, flash memory, and application specific integrated circuits. In addition, a computer readable medium that implements the subject matter described herein may be located on a single device or computing platform or may be distributed across multiple devices or computing platforms.

DETAILED DESCRIPTION

The subject matter described in this specification relates to methods, systems, and computer readable media for operating a telecommunications network using an on-premises computing system for network-impacting functions and an off-premises cloud computing system for other telecommunications functions.

Figure 1:
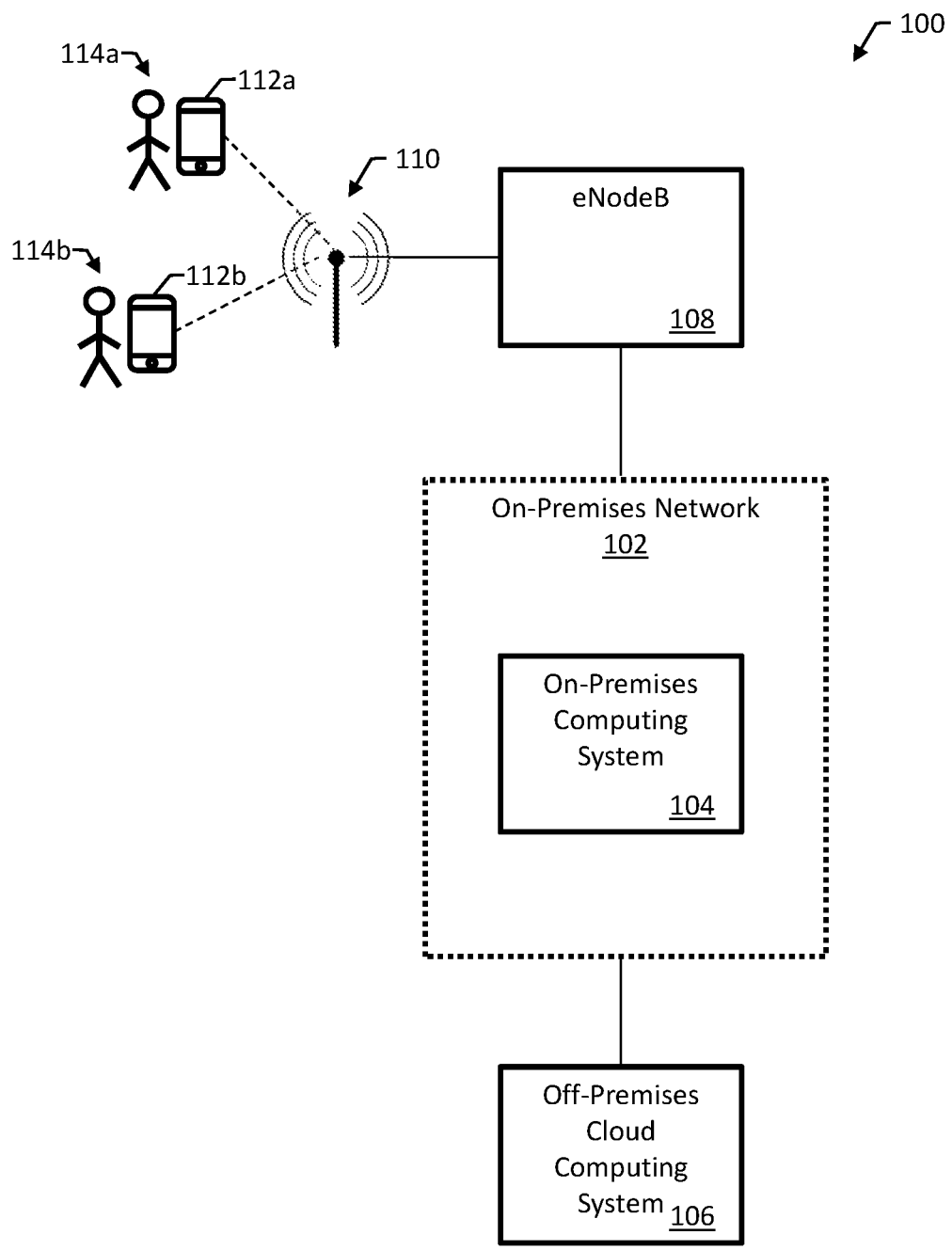
FIG. 1 is a block diagram of an example system for operating a telecommunications network.

FIG. 1 is a block diagram of an example system 100 for operating a telecommunications network. The telecommunications network can be, e.g., a long term evolution (LTE) cellular telecommunications network.

System 100 includes an on-premises data communications network 102 for an on-premises computing system 104. System 100 includes an off-premises cloud computing system 106 that is remote from on-premises network 102. In some examples, on-premises computing system 104 is considered "on-premises" because all of the equipment is located in a single physical facility, e.g., a building or collection of buildings.

In general, however, different computers of on-premises computing system 104 may be in different physical locations and can communicate using on-premises network 102. Typically, the equipment implementing on-premises computing system 104 is maintained by the telecommunications network operator.

In contrast, off-premises cloud computing system 106 is remote from on-premises network 102 and may be maintained by the network operator or by a different entity. Off-premises cloud computing system 106 may be dedicated to hosting telecommunications applications for a particular operator, or cloud computing system 106 may host telecommunications applications for various network operators or may host other applications generally.

System 100 may also include a radio access network including an evolved Node B (eNodeB) 108 and an antenna 110. eNodeB 108 is an element of an LTE radio access network for communicating with user equipment 112a-b of subscribers 114a-b. eNodeB 108 communicates directly with user equipment 112a-b and the core network of the telecommunications network, and eNodeB 108 may lack a separate controller such as a radio network controller (RNC) to simplify the architecture and allow lower response times. In some examples, system 100 includes another type of radio access network, e.g., using a base transceiver station (BTS) in global system for mobile communications (GSM) networks.

Each of UEs 112a-b can be any appropriate user computer system. Each of UEs 112a-b typically includes at least one processor, memory, wireless communications hardware, a display, and at least one user input device. UEs 112a-b can include, for example, a wireless mobile device such as a phone, tablet, or laptop.

In operation, on-premises computing system 104 executes network-impacting telecommunications functions. On-premises computing system 104 offloads other telecommunications functions to off-premises cloud computing system 106 using on-premises network 102. On-premises computing system 104 may offload conventional on-premises telecommunications functions or new telecommunications functions or both. The term "offloading" is used in this document to generally refer to sending data to a remote system for the remote system to carry out a function using the data.

In general, a network-impacting telecommunications function is a telecommunications function that is capable, in operation, of disrupting service to subscribers 114a-b on the telecommunications network. Disrupting service refers to disrupting a basic or fundamental telecommunications service, so that subscribers 114a-b cannot make or receive calls or send and receive data. For example, a network-impacting telecommunications function can be defined as network-impacting in a telecommunications standards document.

A network operator can configure system 100 to execute all of the network-impacting telecommunications functions for the telecommunications network using on-premises computing system 104. The network operator can configure system 100 to execute some or all of the remaining non-network-impacting telecommunications functions for the telecommunications network on off-premises cloud computing system 106 by configuring on-premises computing system 104 to offload those remaining telecommunications functions. For example, on-premises computing system 104 can offload one or more of: a shared quota function, a sponsored data function, a complex billing/charging function, and a network analytics function.

In some examples, offloading other telecommunications functions for the telecommunications network to off-premises cloud computing system 106 includes sending, using on-premises network 102, telecommunications data to off-premises cloud computing system 106 using a cloud application programming interface (API) for an application implementing one of the other telecommunications functions. Then, offloading the other telecommunications functions for the telecommunications network to off-premises cloud computing system 106 can include receiving, using on-premises network 102 and an on-premises API for the application, application-specific data responsive to the telecommunications data.

A network operator could configure system 100 to execute both network-impacting and non-network-impacting telecommunications functions for the telecommunications network using on-premises computing system 104; however, such a configuration may result in unnecessary capital expenditures for on-premises equipment. In that case, some services provided by on-premises equipment can be provided by off-premises cloud computing system 106 while still meeting design goals of the telecommunications network but at a lower cost or with other benefits associating with cloud computing.

For example, implementing some functions on off-premises cloud computing system 106 can enable scalability and remote management. To avoid unnecessary capital expenditures for on-premises equipment, the network operator divides the telecommunications functions into network-impacting functions and other functions. Applications that carry out the telecommunications functions can communicate using APIs, as mentioned above.

Operating a telecommunications network using an on-premises computing system for network-impacting functions and an off-premises cloud computing system for other telecommunications functions can extend the usefulness of existing on-premises telecommunications equipment by augmenting the existing on-premises telecommunications equipment with cloud services. Using an off-premises cloud computing system for other telecommunications functions can also provide a way forward for increasing the use of cloud architectures for telecommunications functions.

Figure 2:
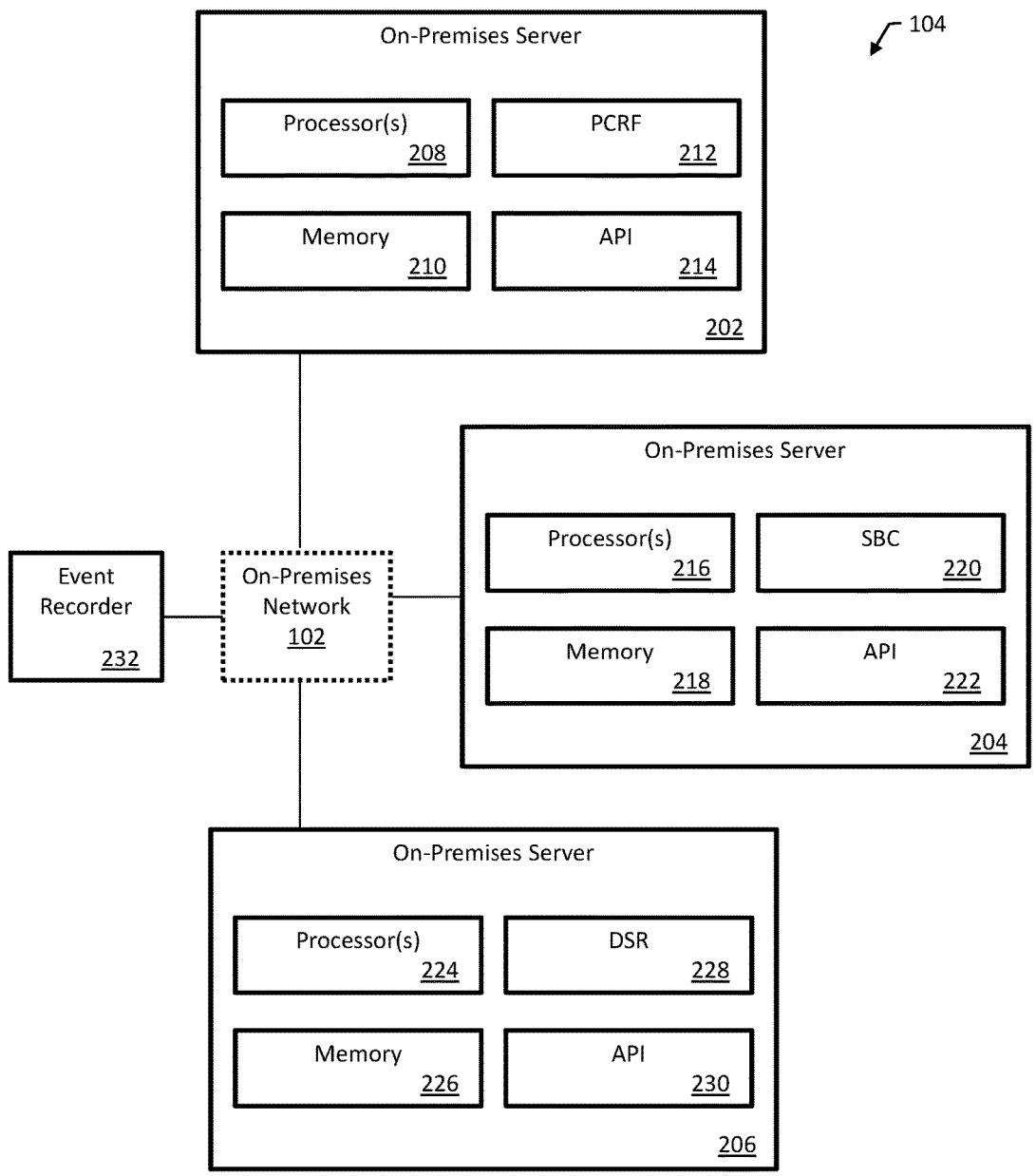
FIG. 2 is a block diagram of an example on-premises computing system.

FIG. 2 is a block diagram of an example on-premises computing system, e.g., the on-premises computing system 104 of FIG. 1. On-premises computing system 104 includes at least three distinct on-premises servers 202, 204, and 206.

Server 202 includes one or more processors 208 and memory 210 storing executable instructions for processors 208, server 204 includes one or more processors 216 and memory 218 storing executable instructions for processor 216, and server 206 includes one or more processors 224 and memory storing executable instructions for processors 224. For example, each of servers 202, 204, and 206 can be implemented on a computing platform that includes one or more processor blades, each implementing a network-impacting telecommunications function.

Server 202 is configured to execute a policy and charging rules function (PCRF) 212. PCRF 212 is an example of a network-impacting telecommunications function. In the event that PCRF 212 is unable to perform as designed, subscribers of the telecommunications network may experience service interruptions.

In some examples, server 202 may be a dedicated PCRF server, i.e., so that server 202 executes PCRF 212 exclusively of other telecommunications functions. This may be useful, e.g., so that a network operator can ensure that PCRF 212 operates at a high availability for other telecommunications nodes, which can reduce service interruptions for subscribers on the telecommunications network.

PCRF 212 is part of a 3GPP policy charging control (PCC) architecture. The elements of the PCC provide access, resource, and quality-of-service (QoS) control. 3GPP standardization encompasses radio access networks, services and systems aspects, and core network and terminals. 3GPP standards address various networks such as an evolved IP multimedia subsystem (IMS) network.

In operation, PCRF 212 functions in real-time or near real-time to determine policy rules in the telecommunications network. PCRF 212 can operate at the network core and access user information and other specialized functions in a centralized manner.

PCRF 212 can aggregate information to and from the telecommunications network, operational supports systems, and other sources in real-time or near real-time, which can be useful for the creation of rules and automatically making policy decisions for each subscriber active on the telecommunications network. Using PCRF 212, the telecommunications network can offer multiple services, QoS levels, and charging rules.

In some examples, PCRF 212 provides the ability to manage both network and user policy in real-time or near real-time. PCRF 212 can efficiently and dynamically route and prioritize network traffic. PCRF 212 can provide a unified view of subscriber context based on one or more of device, network, location, and billing data. PCRF 212 can provide key inputs to revenue assurance and bandwidth management.

PCRF 212 can communicate with other applications implementing telecommunications functions using Diameter. Diameter is an authentication, authorization, and accounting protocol for computer networks. Diameter applications extend the base protocol by adding new commands and/or attributes, e.g., commands and attributes for use with the extensible authentication protocol (EAP). A typical Diameter packet includes a Diameter header and a variable number of attribute-value pairs (AVPs) for encapsulating information relevant to the Diameter message.

Server 204 is configured to execute a session border controller (SBC) 220. SBC 220 is an example of a network-impacting telecommunications function. In the event that SBC 220 is unable to perform as designed, subscribers of the telecommunications network may experience service interruptions.

In some examples, server 204 may be a dedicated SBC server, i.e., so that server 204 executes SBC 220 exclusively of other telecommunications functions. This may be useful, e.g., so that a network operator can ensure that SBC 220 operates at a high availability for other telecommunications nodes, which can reduce service interruptions for subscribers on the telecommunications network.

SBC 220 may be configured for performing a border control function (BCF). SBC 220 may facilitate communications between nodes in the telecommunications network. SBC 220 may perform or utilize network address translation (NAT) and/or firewall functionality. SBC 220 may perform one or more inspection and/or security functions.

For example, SBC 220 may use deep packet inspection (DPI), header inspection, or other techniques in determining whether a received call request or related call is suspicious. In this example, if a received call request or related call is determined to be suspicious, one or more nodes (e.g., PCRF 212) may be informed and an appropriate action may be determined for handling the received call request or related call.

Server 206 is configured to execute a Diameter signaling router (DSR) 228. DSR 228 is an example of a network-impacting telecommunications function. In the event that DSR 228 is unable to perform as designed, subscribers of the telecommunications network may experience service interruptions.

In some examples, server 206 may be a dedicated DSR server, i.e., so that server 206 executes DSR 228 exclusively of other telecommunications functions. This may be useful, e.g., so that a network operator can ensure that DSR 228 operates at a high availability for other telecommunications nodes, which can reduce service interruptions for subscribers on the telecommunications network.

DSR 228 is configured to route Diameter messages (e.g., Credit-Control-Request (CCR) and Credit-Control-Answer (CCA) messages) between Diameter nodes, including applications carrying out telecommunications functions—both network-impacting telecommunications functions and other telecommunications functions. For example, DSR 228 may be an LTE signaling router, an LTE Diameter signaling router, a Diameter signaling agent, a Diameter proxy, a Diameter routing agent, or a Diameter redirect agent. DSR 228 may include functionality for processing various messages and may use routing information (e.g., obtained from a local or remote database) for providing messages to various nodes in the telecommunications network.

DSR 228 may be configured for subscriber binding. For efficiency and cost reduction, some telecommunications providers bind subscribers to specific PCRF servers selected from a pool of PCRF servers for the telecommunications network. The PCRF is configured to make and manage policy decisions for the bound subscribers, so it can be more efficient in terms of computing and network resources for a subscriber to always use the same PCRF server. By binding subscribers to specific PCRF servers, different PCRF servers do not have to retrieve and maintain the data for subscribers bound to other PCRF servers.

In operation, DSR 228 creates bindings between subscribers and PCRF servers selected from a pool of PCRF servers. DSR 228 then routes all policy messages for a given subscriber to the PCRF server that currently hosts that subscriber's policy rules. DSR 228 can perform other functions such as topology hiding to hide network topology information, such as the number and identities of PCRF servers from untrusted external networks.

DSR 228 can maintain bindings using a subscriber binding repository (SBR) including a bindings database. The SBR can host both session and binding databases can provide a distributed, scalable, and high availability database function to DSR 228 for storing and managing the session data and the subscriber-PCRF binding data. The binding database stores bindings between subscribers and PCRF severs, and a session database stores Diameter session information related to policy sessions.

Policy sessions can be established using multiple Diameter interfaces such as Gx, Gxx, Gx-Prime, Rx and S9. A session can be characterized as binding-capable or binding-dependent, depending on whether or not a binding can be created over it.

A session over a binding-capable interface will be eligible to establish a binding to a PCRF server, while a session over a binding-dependent interface will rely on an existing binding to a PCRF server but cannot typically create a new binding by itself.

In order for DSR 228 to route all messages from a subscriber (perhaps through multiple interfaces and devices) to the same PCRF server, DSR 228 is typically configured to identify the subscriber by the information in the incoming Diameter request messages. One subscriber can be associated with multiple subscriber identifiers depending on the access networks and device types used.

The subscriber identifiers can be calling subscriber keys or keys. Messages that can cause creation of a subscriber-PCRF binding can contain the subscriber's device international mobile subscriber identity (IMSI), which can be used to uniquely identify the subscriber. IMSI can be used as the subscriber anchor key in the binding database.

Server 202 implements an API 214 for PCRF 212 to communicate with applications that are offloaded to an off-premises cloud computing system. For example, PCRF 212 may use API 214 for sending, using on-premises network 102, telecommunications data to the off-premises cloud computing system for an application implementing one of the other telecommunications functions. PCRF 212 may use API 214 for receiving, using on-premises network 102, application-specific data responsive to the telecommunications data.

Server 204 implements an API 222 for SBC 220 to communicate with applications that are offloaded to an off-premises cloud computing system. For example, SBC 220 may use API 222 for sending, using on-premises network 102, telecommunications data to the off-premises cloud computing system for an application implementing one of the other telecommunications functions. SBC 220 may use API 222 for receiving, using on-premises network 102, application-specific data responsive to the telecommunications data.

Server 206 implements an API 230 for DSR 228 to communicate with applications that are offloaded to an off-premises cloud computing system. For example, DSR 228 may use API 230 for sending, using on-premises network 102, telecommunications data to the off-premises cloud computing system for an application implementing one of the other telecommunications functions. DSR 228 may use API 230 for receiving, using on-premises network 102, application-specific data responsive to the telecommunications data.

In some examples, on-premises computing system 104 is configured to execute an event recorder 232 to record events generated by applications implementing the network-impacting telecommunications functions. Then, on-premises computing system 104 can be configured to replay the recorded events after cloud services become available following an outage.

For example, on-premises computing system 104 may register for event recording of certain applications. Registration can include specifying a window of time for event recording or a data limit as to the amount of data to keep recorded. Then, event recorder 232 records events for the registered applications and deletes the records as specified during registration.

Event recorder 232 may be external or internal to on-premises computing system 104. For example, one or more of servers 202, 204, and 206 may implement event recorder 232. For purposes of illustration, event recorder 232 is illustrated separately from servers 202, 204, and 206 in FIG. 2, even though servers 202, 204, and 206 may each implement a separate event recorder or may collectively implement event recorder 232.

In some examples, on-premises computing system 104 is configured to carry out other network-impacting telecommunications functions that are not depicted in FIG. 2. For example, on-premises computing system 104 can be configured to execute a policy and charging enforcement function (PCEF), e.g., on a computer system operating as a packet gateway (PGW), an access network gateway (AN-GW) or other gateways, and a mobility management entity (MME). These example functions are described below for purposes of illustration.

The PCEF is configured to enforce any policy and charging control (PCC) decisions made by PCRF 212 and handle service data flows (e.g., forwarding or dropping packets related to a requested service). The PCEF may be configured for traffic detection and resultant policy enforcement. The PCEF provides information to PCRF 212 about user equipment and any requested services.

The PGW can provide connectivity from user equipment to external packet data networks by being the point of exit and entry of traffic for or/and from the user equipment. The PCEF, in combination with the PGW, can perform policy enforcement, packet filtering, charging support, packet screening, and the like.

The AN-GW is configured for the delivery of data packets to and from a number of mobile stations, e.g., mobile stations within a geographic service area. The AN-GW performs telecommunications functions including packet routing and transfer, mobility management (attach/detach and location management), logical link management, and authentication and charging functions. The location register of the AN-GW can store location information and subscriber profiles of subscribers registered with AN-GW.

The MME can be responsible for idle mode UE paging and tagging procedure including retransmissions. The MME can be involved in the bearer activation/deactivation process and can be responsible for choosing a serving gateway (SGW) for a UE at the initial attach and at time of intra-network handover involving core network (CN) node relocation.

The MME can be responsible for authenticating subscribers. The non-access stratum (NAS) signaling terminates at the MME, and the MME can be responsible for generation and allocation of temporary identities to user equipment. The MME can check the authorization of the UE to camp on the service provider's public land mobile network (PLMN) and enforces UE roaming restrictions. The MME can be the termination point in the network for ciphering/integrity protection for NAS signaling and can handle the security key management.

Figure 3:
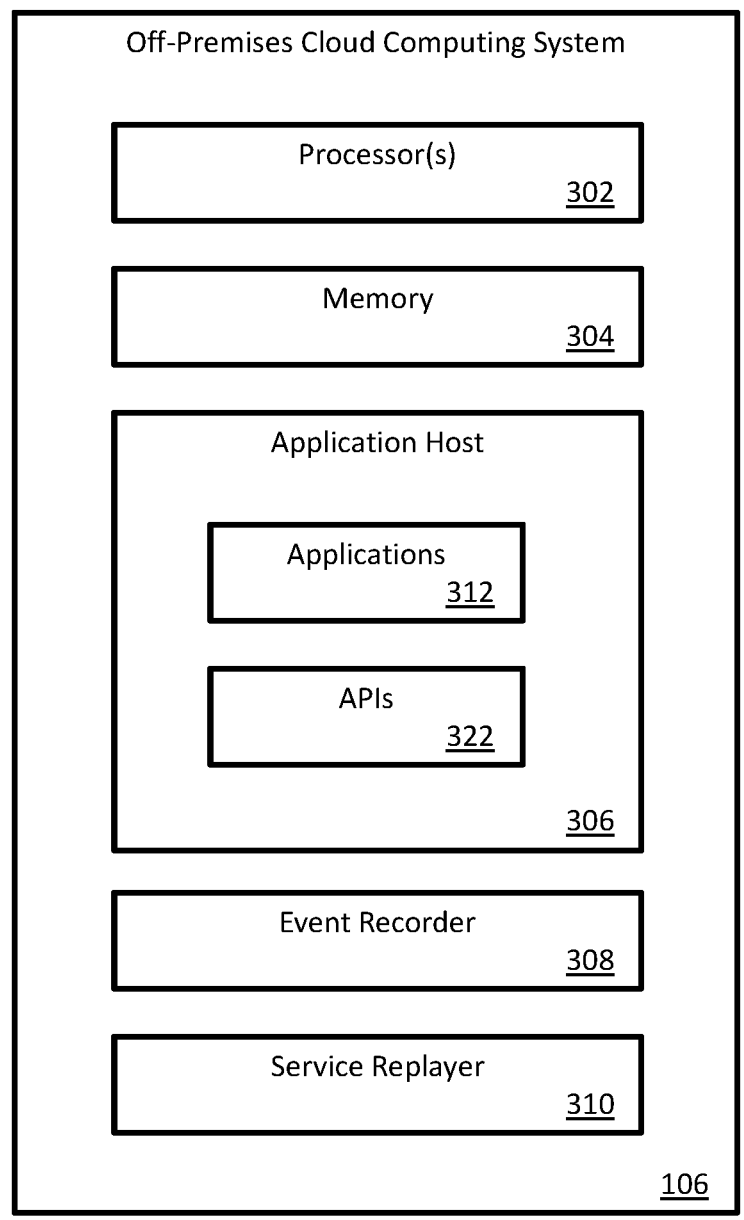
FIG. 3 is a block diagram of an example off-premises cloud computing system.

FIG. 3 is a block diagram of an example off-premises cloud computing system, e.g., the off-premises cloud computing system 106 of FIG. 1. Off-premises cloud computing system 106 includes one or more processors 302 and memory 304 storing executable instructions for processors 302. Off-premises cloud computing system 106 is configured to implement an application host 306, an event recorder 308, and a service replayer 310.

Cloud computing is a model for enabling convenient, on-demand network access to a shared pool of configurable computing resources (e.g., networks, servers, storage, applications, and services). The services provided or accessed through the cloud (or network) are referred to as cloud services. Off-premises cloud computing system 106 may include a suite of applications, middleware and database service offerings that are delivered to a customer in a self-service, subscription-based, elastically scalable, reliable, highly available, and secure manner.

Off-premises cloud computing system 106 may be configured for implementing one or more of the following cloud computing functions for customers such as network operators:

provisioning, managing, and tracking a customer's subscription for services and resources in off-premises cloud computing system 106 providing predictable operating expenses to customers utilizing the services in off-premises cloud computing system 106 providing robust identity domain separation and protection of a customer's data in off-premises cloud computing system 106 providing customers with a transparent architecture and control of the design of off-premises cloud computing system 106 providing customers assured data protection and compliance with data privacy standards and regulations providing customers with an integrated development experience for building and deploying services in off-premises cloud computing system 106 providing customers with a seamless integration between business software, middleware, database and infrastructure services in off-premises cloud computing system 106

Application host 306 is configured for providing a cloud computing service by hosting various applications 312 and APIs 322. Application host 306 provides a platform for applications 312 to access cloud computing resources such as processors 302 and memory 304. For example, application host 306 can include a virtualization environment configured to simulate components of a computing device, such as a processor, system memory, and a storage device, for executing one or more virtual machines (VMs). The virtual machines can be configured to perform various functions and/or services, such as web server functions or cloud application services, and can interact with various nodes, components, and/or users.

Applications 312 include at least some applications implementing non-network-impacting telecommunications functions. The non-network-impacting telecommunications functions can receive telecommunications data using a cloud API. The non-network-impacting telecommunications functions can send application-specific data responsive to the telecommunications data using an on-premises API.

For example, on-premises computing system 104 can offload one or more of: a shared quota function, a sponsored data function, a complex billing/charging function, and a network analytics function. A shared quota function enables multiple subscribers to share a same quota for network utilization, e.g., a same quota for an amount of data, calling time, or text messages over a time period such as a month.

In operation, a network-impacting function such as a PCRF, executing on on-premises computing system 104, may supply telecommunications data such as usage data to the shared quota function. The shared quota function, executing on off-premises cloud computing system 106, can determine whether the shared quota has been exceeded and send application-specific responsive data such as reports to the PCRF in the event that the shared quota has been exceed.

In a system with the shared quota function implemented on off-premises cloud computing system 106, the telecommunications network benefits from the reduced costs and scalability of off-premises cloud computing system 106. The shared quota function does not need to execute continually in real time to prevent service interruptions to subscribers, so any delays due to offloading the shared quota function may be tolerable to the network operator.

A sponsored data function allows an entity, such as a business or an educational institution or a government, to handle billing for one or more subscribers. Some sponsored data functions may require customized data to operate according to a customer's needs and some sponsored data functions may not need to execute continuously in real-time to prevent service interruptions to subscribers. Those sponsored data functions can be offloaded to off-premises cloud computing system 106.

Complex billing/charging functions can vary depending on the needs of the customers. Offloading these functions to off-premises cloud computing system 106 can enable a network operator to support more variations in billing/charging without increasing the chances of impacting subscriber services by increasing the computing load on on-premises computing system 104.

Similarly, network analytics functions can vary depending on the needs of the customers. Some network analytics functions may need to execute only infrequently, which can potentially cause sudden increases in computing resource utilization. Since off-premises cloud computing system 106 is configured for scalability by virtue of cloud computing technology, off-premises cloud computing system 106 may be able to perform such network analytics functions by allocating additional resources and then deallocating those resources afterwards, thereby leaving the on-premises computing system 104 to continue perform network-impacting telecommunications functions without interruption.

Event recorder 308 is configured for to record events generated by applications implementing the non-network-impacting telecommunications functions. Event recorder 308 records events destined for on-premises computing system 104. For example, on-premises computing system 104 may register for event recording of certain applications. Registration can include specifying a window of time for event recording or a data limit as to the amount of data to keep recorded. Then, event recorder 308 records events for the registered applications and deletes the records as specified during registration.

On-premises computing system 104 can register by exchanging messages with event recorder 308, e.g., using a cloud API. In some examples, event recorder 308 is preconfigured by a network operator to record events for all telecommunications functions to ensure recording even without registration for specific applications.

Service replayer 310 is configured for replaying services after on-premises services become available following an outage using events recorded by event recorder 308 prior to the outage. For example, service replayer 310 can determine a start time and an end time of an outage by off-premises cloud computing system 106, e.g., by communicating with a system or network operating application. The outage may be a general outage, e.g., a complete loss of network connectivity, or the outage may be specific to the telecommunications network.

Service replayer 310 can then generate duplicates of the recorded events generated between the start time and the end time. As a result, even if a particular application cannot repeat its function, service replayer 310 can prevent data from being lost during the outage, even if there is a delay in providing that data.

Together, event recorder 308 and service replayer 310 can provide increased reliability of the non-network-impacting telecommunications functions. Increased reliability may be useful since the non-network-impacting telecommunications functions are being executed at off-premises cloud computing system 106, which may be subject to more interruptions than on-premises computing system 104 due to network failures or system overloads related to other non-telecommunications applications.

Figure 4:
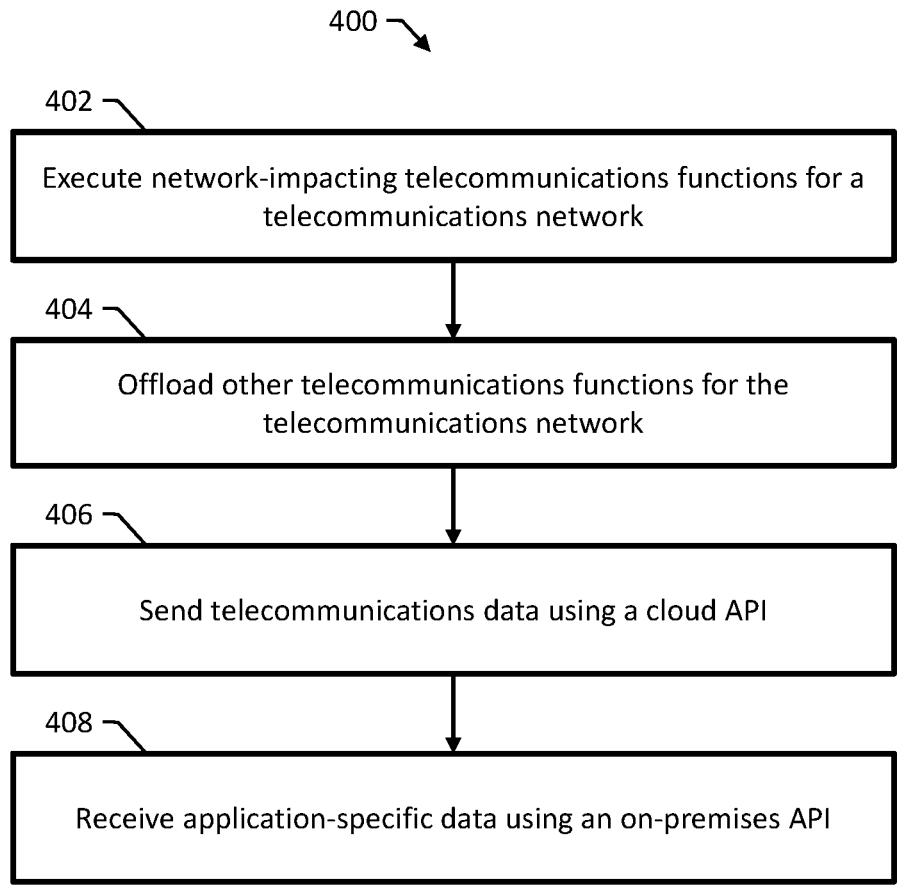
FIG. 4 is a flow diagram of an example method for operating a telecommunications network using an on-premises computing system.

FIG. 4 is a flow diagram of an example method 400 for operating a telecommunications network using an on-premises computing system and an off-premises cloud computing system. Method 400 is performed by the on-premises computing system, e.g., the on-premises computing system 104 of FIG. 1.

Method 400 includes executing, at an on-premises computing system including at least one processor, one or more network-impacting telecommunications functions for the telecommunications network (402). In some examples, each of the network-impacting telecommunications functions is capable, in operation, of disrupting service on the telecommunications network and each of the other telecommunications functions is not capable, in operation, of disrupting service on the telecommunications network. In some examples, each of the network-impacting telecommunications functions is defined in a telecommunications standards document as a network-impacting function.

Method 400 includes offloading, at the on-premises computing system using an on-premises network, one or more other telecommunications functions for the telecommunications network to an off-premises cloud computing system remote from the on-premises network (404). Offloading the other telecommunications functions for the telecommunications network to the off-premises cloud computing system can include offloading one or more of: a shared quota function, a sponsored data function, a complex billing/charging function, and a network analytics function.

In some examples, the on-premises computing system includes a first computer system, and executing the network-impacting telecommunications functions includes executing a policy and charging rules function (PCRF) on the first computer system. In some examples, the on-premises computing system includes a second computer system and a third computer system, and executing the network-impacting telecommunications functions includes executing a session border controller (SBC) on the second computer system and executing a Diameter signaling router (DSR) on the third computer system.

In some examples, offloading the other telecommunications functions for the telecommunications network to the off-premises cloud computing system includes sending, using the on-premises network, telecommunications data to the cloud computing system using a cloud API for an application implementing one of the other telecommunications functions (406). In some examples, offloading the other telecommunications functions for the telecommunications network to the off-premises cloud computing system includes receiving, using the on-premises network and an on-premises API for the application, application-specific data responsive to the telecommunications data (408).

In some examples, method 400 includes configuring the off-premises cloud computing system to execute an event recorder to record events generated by applications implementing the other telecommunications functions and executing on the off-premises cloud computing system. Then, method 400 can include configuring the off-premises cloud computing system to replay services after cloud services become available following an outage using events recorded prior to the outage.

Figure 5:
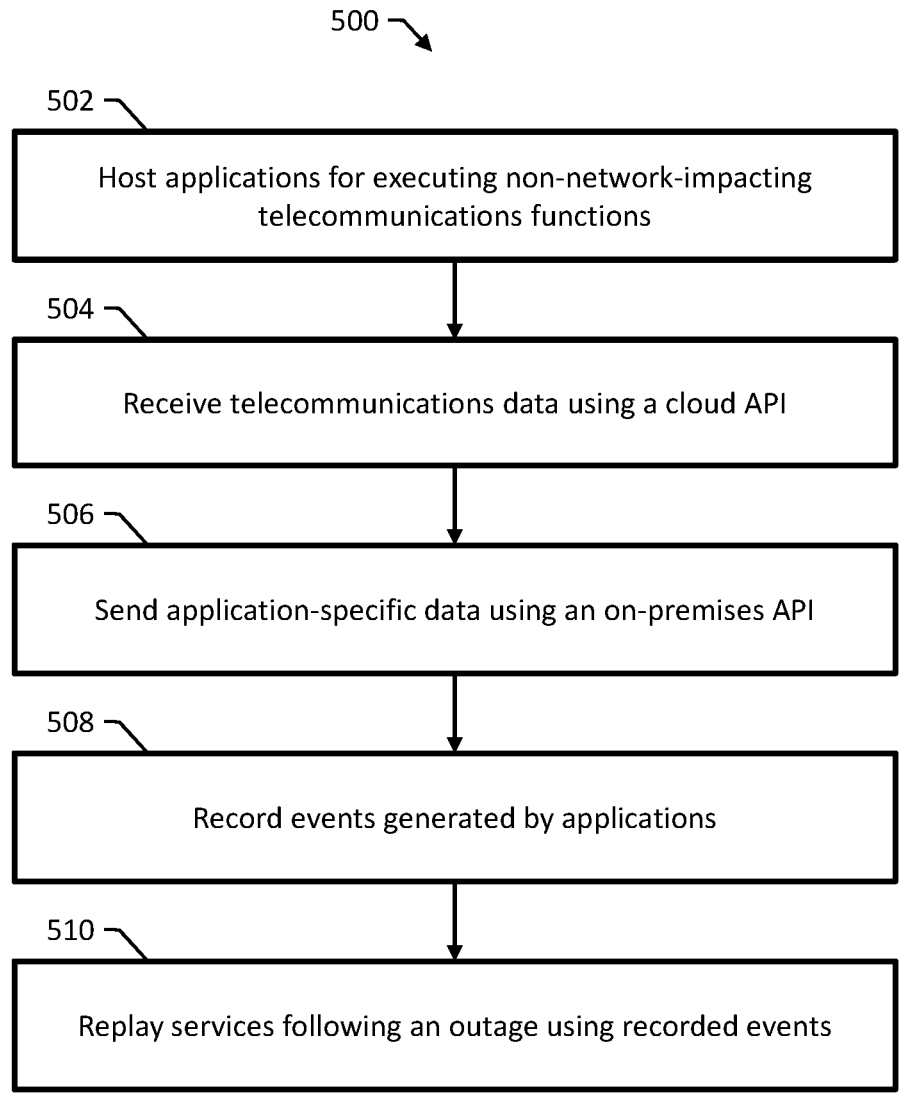
FIG. 5 is a flow diagram of an example method for operating a telecommunications network using an off-premises cloud computing system.

FIG. 5 is a flow diagram of an example method 500 for operating a telecommunications network using an on-premises computing system and an off-premises cloud computing system. Method 500 is performed by the off-premises cloud computing system, e.g., the off-premises cloud computing system 106 of FIG. 1.

Method 500 includes hosting applications for executing non-network-impacting telecommunications functions (502). Method 500 includes receiving telecommunications data using a cloud API for an application implementing one of the other telecommunications functions (504). Method 500 includes sending, using an on-premises API for the application, application-specific data responsive to the telecommunications data (506).

In some examples, method 500 includes executing an event recorder to record events generated by applications implementing the other telecommunications functions and executing on the off-premises cloud computing system (508). Then, method 500 can include replaying services after cloud services become available following an outage using events recorded prior to the outage (510).

Figure 6:
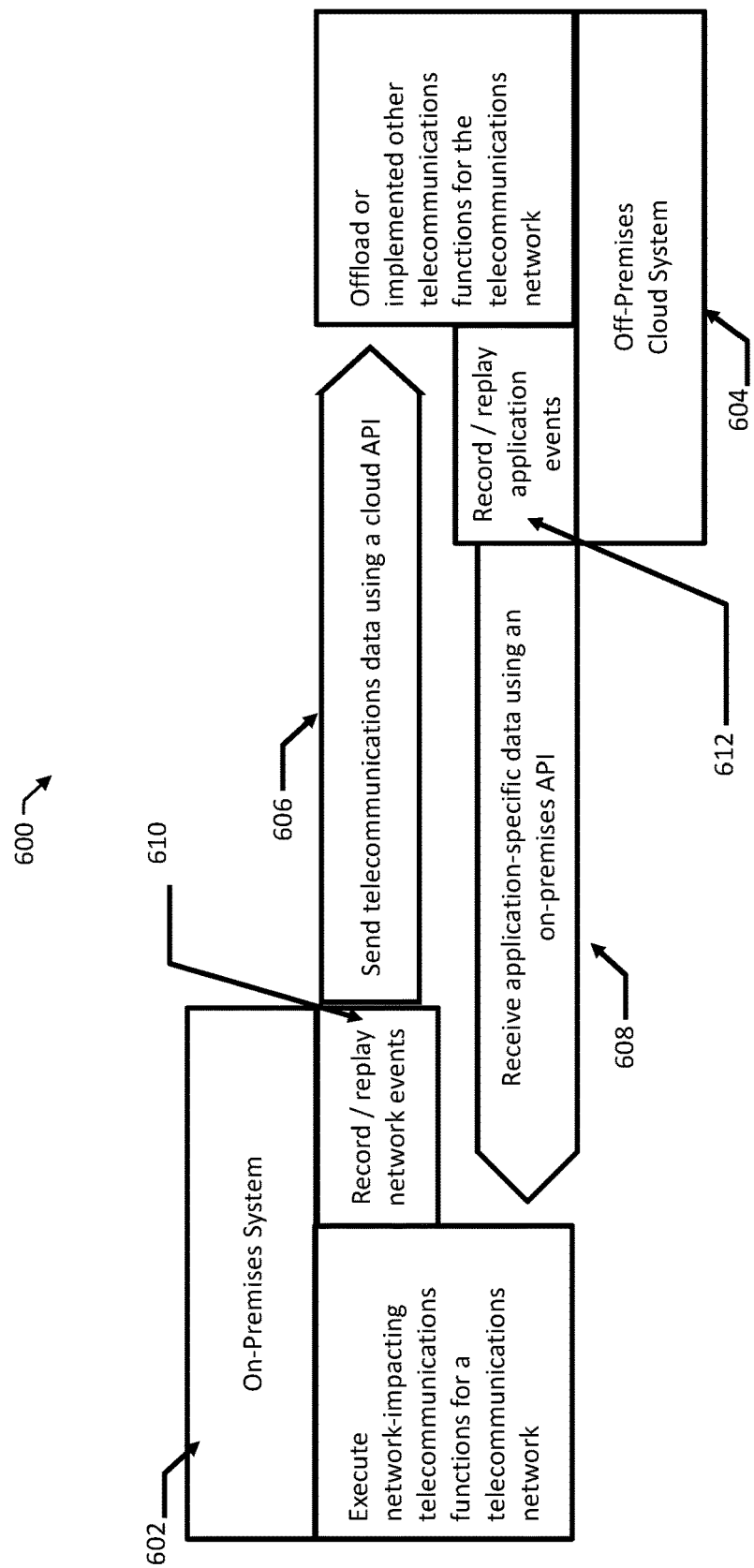
FIG. 6 is a block diagram illustrating a system that uses event recorders both on-premises and in an off-premises cloud computing system.

FIG. 6 is a block diagram illustrating a system 600 that uses event recorders both on-premises and in an off-premises cloud computing system. System 600 includes an on-premises system 602 and an off-premises cloud system 604. On-premises system 602 sends 606 telecommunications data to off-premises cloud system 604 using a cloud API, and off-premises cloud system 604 receives 608 application-specific data using an on-premises API.

On-premises system 602 includes an event recorder 610 configured for recording and replaying network events during an outage of off-premises cloud system 604. In case of an outage of off-premises cloud system 604 (e.g., due to a network failure or other failure of off-premises cloud system 604), on-premises system 602 can buffer the events and replay events after communication between on-premises system 602 and off-premises cloud system 604 has been reestablished. On-premises system 602 can perform the buffering, e.g., using the cloud API, or on-premises system 602 may include a cloud gateway such as a DSR that performs the recording and replaying functions.

Off-premises cloud system 604 also includes an event recorder 612 configured for recording and replaying network events during an outage. Since both on-premises system 602 and off-premises cloud system 604 include event recorders, the other telecommunications functions offloaded to off-premises cloud system 604 can continue to operate even though off-premises cloud system 604 may occasionally experience outages.

Accordingly, while the methods, systems, and computer readable media have been described herein in reference to specific embodiments, features, and illustrative embodiments, it will be appreciated that the utility of the subject matter is not thus limited, but rather extends to and encompasses numerous other variations, modifications and alternative embodiments, as will suggest themselves to those of ordinary skill in the field of the present subject matter, based on the disclosure herein.

Various combinations and sub-combinations of the structures and features described herein are contemplated and will be apparent to a skilled person having knowledge of this disclosure. Any of the various features and elements as disclosed herein may be combined with one or more other disclosed features and elements unless indicated to the contrary herein. Correspondingly, the subject matter as hereinafter claimed is intended to be broadly construed and interpreted, as including all such variations, modifications and alternative embodiments, within its scope and including equivalents of the claims.

It is understood that various details of the presently disclosed subject matter may be changed without departing from the scope of the presently disclosed subject matter. Furthermore, the foregoing description is for the purpose of illustration only, and not for the purpose of limitation.

What is claimed is:

1. A system for operating a telecommunications network, the system comprising:
   an off-premises cloud computing system; and
   an on-premises computing system comprising at least one processor and configured for:
      executing one or more network-impacting telecommunications functions for the telecommunications network; and
      offloading one or more other telecommunications functions for the telecommunications network to the off-premises cloud computing system, wherein offloading the other telecommunications functions for the telecommunications network to the off-premises cloud computing system comprises sending telecommunications data to the off-premises cloud computing system using a cloud application programming interface (API) for an application implementing one of the other telecommunications functions,
   wherein the on-premises computing system is configured to execute an event recorder to record events generated by the telecommunications network or the network-impacting telecommunications functions or both, and wherein the on-premises computing system is configured to replay the recorded events after cloud services become available following an outage.

2. The system of claim 1, wherein each of the network-impacting telecommunications functions is capable, in operation, of disrupting service on the telecommunications network and each of the other telecommunications functions is not capable, in operation, of disrupting service on the telecommunications network.

3. The system of claim 1, wherein each of the network-impacting telecommunications functions is defined in a telecommunications standards document as a network-impacting function.

4. The system of claim 1, wherein the on-premises computing system comprises a first computer system, and wherein executing the network-impacting telecommunications functions comprises executing a policy and charging rules function (PCRF) on the first computer system.

5. The system of claim 4, wherein the on-premises computing system comprises a second computer system and a third computer system, and wherein executing the network-impacting telecommunications functions comprises executing a session border controller (SBC) on the second computer system and executing a Diameter signaling router (DSR) on the third computer system.

6. The system of claim 1, wherein offloading the other telecommunications functions for the telecommunications network to the off-premises cloud computing system comprises offloading one or more of: a sponsored data function, a complex billing/charging function, and a network analytics function.

7. The system of claim 1, wherein offloading the other telecommunications functions for the telecommunications network to the off-premises cloud computing system comprises offloading a shared quota function enabling multiple subscribers to share a same quota for network utilization of the telecommunications network.

8. The system of claim 1, wherein offloading the other telecommunications functions for the telecommunications network to the off-premises cloud computing system comprises receiving, using an on-premises application programming interface (API) for the application, application-specific data responsive to the telecommunications data.

9. A system for operating a telecommunications network, the system comprising:
   an off-premises cloud computing system; and
   an on-premises computing system comprising at least one processor and configured for:
      executing one or more network-impacting telecommunications functions for the telecommunications network; and
      offloading one or more other telecommunications functions for the telecommunications network to the off-premises cloud computing system, wherein offloading the other telecommunications functions for the telecommunications network to the off-premises cloud computing system comprises sending telecommunications data to the off-premises cloud computing system using a cloud application programming interface (API) for an application implementing one of the other telecommunications functions;

wherein the off-premises cloud computing system is configured to execute an event recorder to record events generated by applications implementing the other telecommunications functions executing on the off-premises cloud computing system, and wherein the off-premises cloud computing system is configured to replay services after cloud services become available following an outage using events recorded prior to the outage.

10. A method for operating a telecommunications network, the method comprising:

executing, at an on-premises computing system comprising at least one processor, one or more network-impacting telecommunications functions for the telecommunications network;

offloading, at the on-premises computing system using an on-premises network, one or more other telecommunications functions for the telecommunications network to an off-premises cloud computing system remote from the on-premises network, wherein offloading the other telecommunications functions for the telecommunications network to the off-premises cloud computing system comprises sending telecommunications data to the off-premises cloud computing system using a cloud application programming interface (API) for an application implementing one of the other telecommunications functions; and executing an event recorder to record events generated by the telecommunications network or the network-impacting telecommunications functions or both, and replaying the recorded events after cloud services become available following an outage.

11. The method of claim 10, wherein each of the network-impacting telecommunications functions is capable, in operation, of disrupting service on the telecommunications network and each of the other telecommunications functions is not capable, in operation, of disrupting service on the telecommunications network.

12. The method of claim 10, wherein each of the network-impacting telecommunications functions is defined in a telecommunications standards document as a network-impacting function.

13. The method of claim 10, wherein the on-premises computing system comprises a first computer system, and wherein executing the network-impacting telecommunications functions comprises executing a policy and charging rules function (PCRF) on the first computer system.

14. The method of claim 13, wherein the on-premises computing system comprises a second computer system and a third computer system, and wherein executing the network-impacting telecommunications functions comprises executing a session border controller (SBC) on the second computer system and executing a Diameter signaling router (DSR) on the third computer system.

15. The method of claim 10, wherein offloading the other telecommunications functions for the telecommunications network to the off-premises cloud computing system comprises offloading one or more of: a sponsored data function, a complex billing/charging function, and a network analytics function.

16. The method of claim 10, wherein offloading the other telecommunications functions for the telecommunications network to the off-premises cloud computing system comprises offloading a shared quota function enabling multiple subscribers to share a same quota for network utilization of the telecommunications network.

17. The method of claim 10, wherein offloading the other telecommunications functions for the telecommunications network to the off-premises cloud computing system comprises receiving, using the on-premises network and an on-premises application programming interface (API) for the application, application-specific data responsive to the telecommunications data.

18. A method for operating a telecommunications network, the method comprising:

executing, at an on-premises computing system comprising at least one processor, one or more network-impacting telecommunications functions for the telecommunications network; and offloading, at the on-premises computing system using an on-premises network, one or more other telecommunications functions for the telecommunications network to an off-premises cloud computing system remote from the on-premises network, wherein offloading the other telecommunications functions for the telecommunications network to the off-premises cloud computing system comprises sending telecommunications data to the off-premises cloud computing system using a cloud application programming interface (API) for an application implementing one of the other telecommunications functions; and configuring the off-premises cloud computing system to execute an event recorder to record events generated by applications implementing the other telecommunications functions and executing on the off-premises cloud computing system, and configuring the off-premises cloud computing system to replay services after cloud services become available following an outage using events recorded prior to the outage.

19. A non-transitory computer readable medium having stored thereon executable instructions that when executed by one or more processors control the one or more processors to perform operations comprising:

executing, at an on-premises computing system comprising at least one processor, one or more network-impacting telecommunications functions for a telecommunications network;

offloading, at the on-premises computing system using an on-premises network, one or more other telecommunications functions for the telecommunications network to an off-premises cloud computing system remote from the on-premises network, wherein offloading the other telecommunications functions for the telecommunications network to the off-premises cloud computing system comprises sending telecommunications data to the off-premises cloud computing system using a cloud application programming interface (API) for an application implementing one of the other telecommunications functions; and executing an event recorder to record events generated by the telecommunications network or the network-impacting telecommunications functions or both, and replaying the recorded events after cloud services become available following an outage.

* * * * *